(12) United States Patent
Gerber et al.

(10) Patent No.: US 10,666,610 B2
(45) Date of Patent: *May 26, 2020

(54) HYBRID UNICAST/ANYCAST CONTENT DISTRIBUTION NETWORK SYSTEM

(71) Applicant: AT&T INTELLECTUAL PROPERTY II, L.P., Atlanta, GA (US)

(72) Inventors: Alexandre Gerber, Madison, NJ (US); Oliver Spatscheck, Randolph, NJ (US); Jacobus Van der Merwe, Salt Lake City, UT (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/252,204

(22) Filed: Jan. 18, 2019

(65) Prior Publication Data

US 2019/0173835 A1    Jun. 6, 2019

Related U.S. Application Data

(63) Continuation of application No. 15/237,813, filed on Aug. 16, 2016, now Pat. No. 10,187,350, which is a continuation of application No. 12/268,744, filed on Nov. 11, 2008, now Pat. No. 9,426,213.

(51) Int. Cl.
*G06F 15/16* (2006.01)
*H04L 29/12* (2006.01)
*H04L 29/08* (2006.01)

(52) U.S. Cl.
CPC ...... *H04L 61/2007* (2013.01); *H04L 67/1002* (2013.01); *H04L 67/1021* (2013.01); *H04L 67/2842* (2013.01); *H04L 61/6009* (2013.01)

(58) Field of Classification Search
CPC .............. H04N 21/266; H04N 21/6408; H04L 2012/5641
See application file for complete search history.

(56) References Cited

U.S. PATENT DOCUMENTS

| | | |
|---|---|---|
| 5,822,320 A | 10/1998 | Horikawa et al. |
| 6,236,652 B1 | 5/2001 | Preston et al. |
| 6,327,252 B1 | 12/2001 | Silton et al. |
| 6,415,323 B1 | 7/2002 | McCanne et al. |
| 6,687,731 B1 | 2/2004 | Kavak |
| 6,920,129 B2 | 7/2005 | Preston et al. |
| 7,254,138 B2 | 8/2007 | Sandstrom |
| 7,254,636 B1 | 8/2007 | O'Toole et al. |

(Continued)

FOREIGN PATENT DOCUMENTS

| | | |
|---|---|---|
| EP | 1865684 | 12/2007 |
| WO | 01/18641 | 3/2001 |

*Primary Examiner* — Arvin Eskandarnia
(74) *Attorney, Agent, or Firm* — Akerman LLP; Michael K. Dixon; Mammen (Roy) P. Zachariah, Jr.

(57) ABSTRACT

A method includes receiving a request for an edge cache address, and comparing a requestor address to an anycast group. The method can further include providing an anycast edge cache address when the requestor address is in the anycast group. Alternatively, the method can further include determining an optimal cache server, and providing a unicast address of the optimal cache server when the requestor address is not in the anycast group.

20 Claims, 4 Drawing Sheets

(56) References Cited

U.S. PATENT DOCUMENTS

| | | |
|---|---|---|
| 7,328,009 B2 | 2/2008 | Takeda et al. |
| 7,330,906 B2 | 2/2008 | Hameleers et al. |
| 7,340,505 B2 | 3/2008 | Lisiecki et al. |
| 7,343,422 B2 | 3/2008 | Garcia-Luna-Aceves et al. |
| 7,574,499 B1 | 8/2009 | Swildens et al. |
| 7,725,596 B2 | 5/2010 | Garcia-Luna-Aceves et al. |
| 7,734,730 B2 | 6/2010 | McCanne |
| 7,769,177 B2 | 8/2010 | Son et al. |
| 7,797,426 B1 | 9/2010 | Lyon |
| 2002/0004846 A1 | 1/2002 | Garcia-Luna-Aceves et al. |
| 2002/0016860 A1 | 2/2002 | Garcia-Luna-Aceves et al. |
| 2002/0026511 A1 | 2/2002 | Garcia-Luna-Aceves et al. |
| 2003/0051016 A1 | 3/2003 | Miyoshi |
| 2003/0079027 A1 | 4/2003 | Slocombe et al. |
| 2003/0152106 A1* | 8/2003 | Burmeister ....... H04L 29/06027 370/468 |
| 2003/0156550 A1* | 8/2003 | Burmeister ............... H04L 1/16 370/252 |
| 2003/0182410 A1 | 9/2003 | Balan |
| 2003/0193958 A1 | 10/2003 | Narayanan |
| 2004/0107234 A1 | 6/2004 | Rajahalme |
| 2004/0143662 A1 | 7/2004 | Poyhonen et al. |
| 2004/0165527 A1* | 8/2004 | Gu .................... H04L 29/06027 370/229 |
| 2004/0165565 A1 | 8/2004 | Omae et al. |
| 2005/0164729 A1 | 7/2005 | Narayanan et al. |
| 2005/0198367 A1 | 9/2005 | Ettikan |
| 2006/0018299 A1 | 1/2006 | Yamamoto |
| 2006/0018317 A1 | 1/2006 | Jimmei |
| 2006/0193252 A1 | 8/2006 | Naseh et al. |
| 2006/0209885 A1 | 9/2006 | Hain et al. |
| 2006/0221866 A1 | 10/2006 | Shepherd |
| 2006/0236394 A1 | 10/2006 | Morrow et al. |
| 2006/0271705 A1 | 11/2006 | Garcia-Luna-Aceves et al. |
| 2007/0088708 A1 | 4/2007 | Vijayarajan |
| 2007/0133539 A1 | 6/2007 | Kang et al. |
| 2007/0243821 A1 | 10/2007 | Hundscheidt et al. |
| 2008/0235400 A1 | 3/2008 | Slocombe et al. |
| 2008/0080513 A1 | 4/2008 | Kang |
| 2008/0123640 A1 | 5/2008 | Bhatia et al. |
| 2008/0126529 A1 | 5/2008 | Kim et al. |
| 2009/0013083 A9 | 1/2009 | Garcia-Luna-Aceves et al. |
| 2009/0113057 A1 | 4/2009 | Van der Merwe et al. |
| 2010/0131671 A1 | 5/2010 | Kohli et al. |
| 2010/0235542 A1 | 9/2010 | Visharam et al. |
| 2011/0082916 A1 | 4/2011 | Swanson et al. |
| 2011/0082944 A1 | 4/2011 | Swanson et al. |
| 2011/0173345 A1 | 7/2011 | Knox et al. |
| 2011/0246657 A1 | 10/2011 | Glow |
| 2011/0296048 A1 | 12/2011 | Knox et al. |
| 2012/0023198 A1 | 1/2012 | Swanson et al. |

\* cited by examiner

HYBRID UNICAST/ANYCAST CONTENT DISTRIBUTION NETWORK SYSTEM

CROSS REFERENCE TO RELATED APPLICATIONS

This application is a continuation of and claims the benefit of U.S. patent application Ser. No. 15/237,813, filed Aug. 16, 2016, which is a continuation of and claims the benefit of U.S. patent application Ser. No. 12/268,744, filed Nov. 11, 2008, now U.S. Pat. No. 9,426,213, which are hereby incorporated by reference in their entireties.

FIELD OF THE DISCLOSURE

The present disclosure generally relates to communications networks, and more particularly relates to a hybrid unicast/anycast content distribution network.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
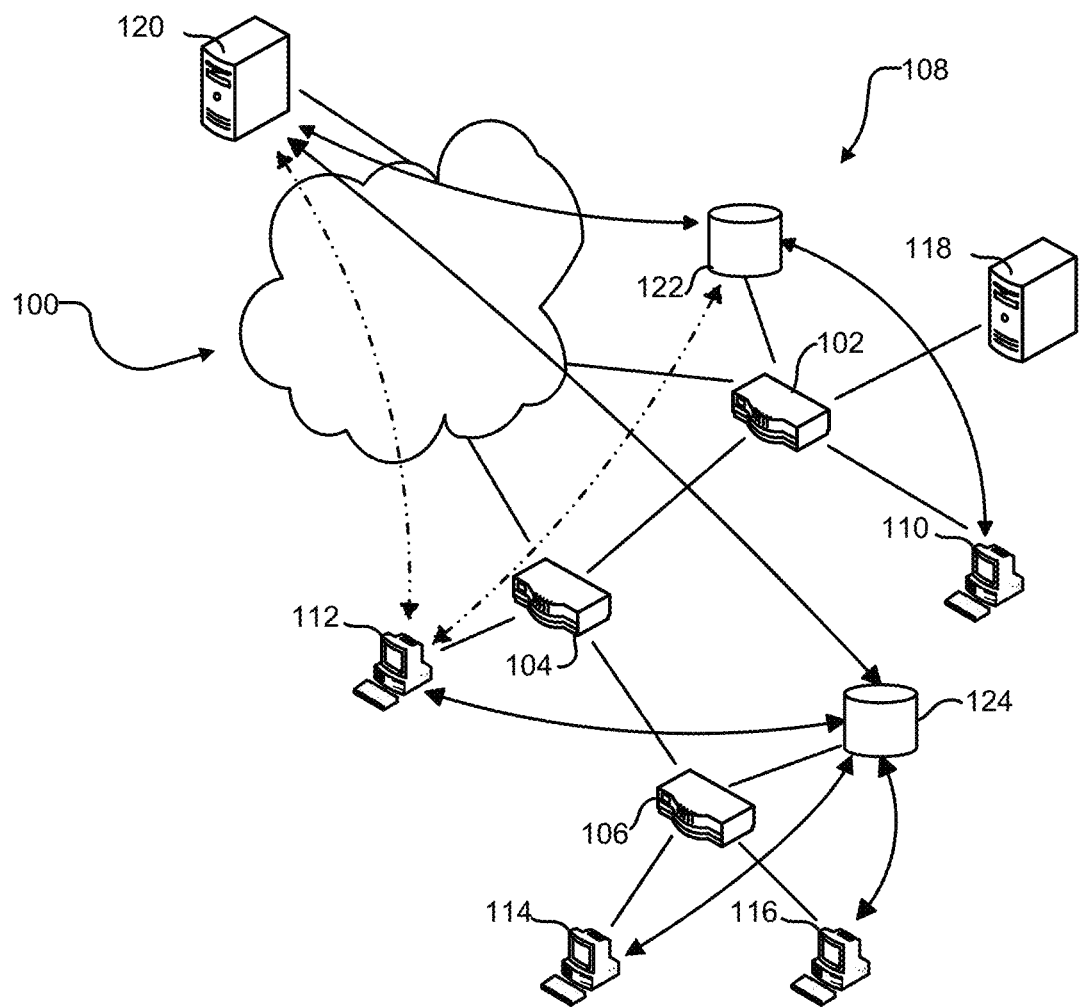
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphics, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 that replicate content on the server 120 and that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost and time savings of providing content from the cache, the most popular content may be stored in the cache, while less popular content is retrieved from server 120.

Figure 2:
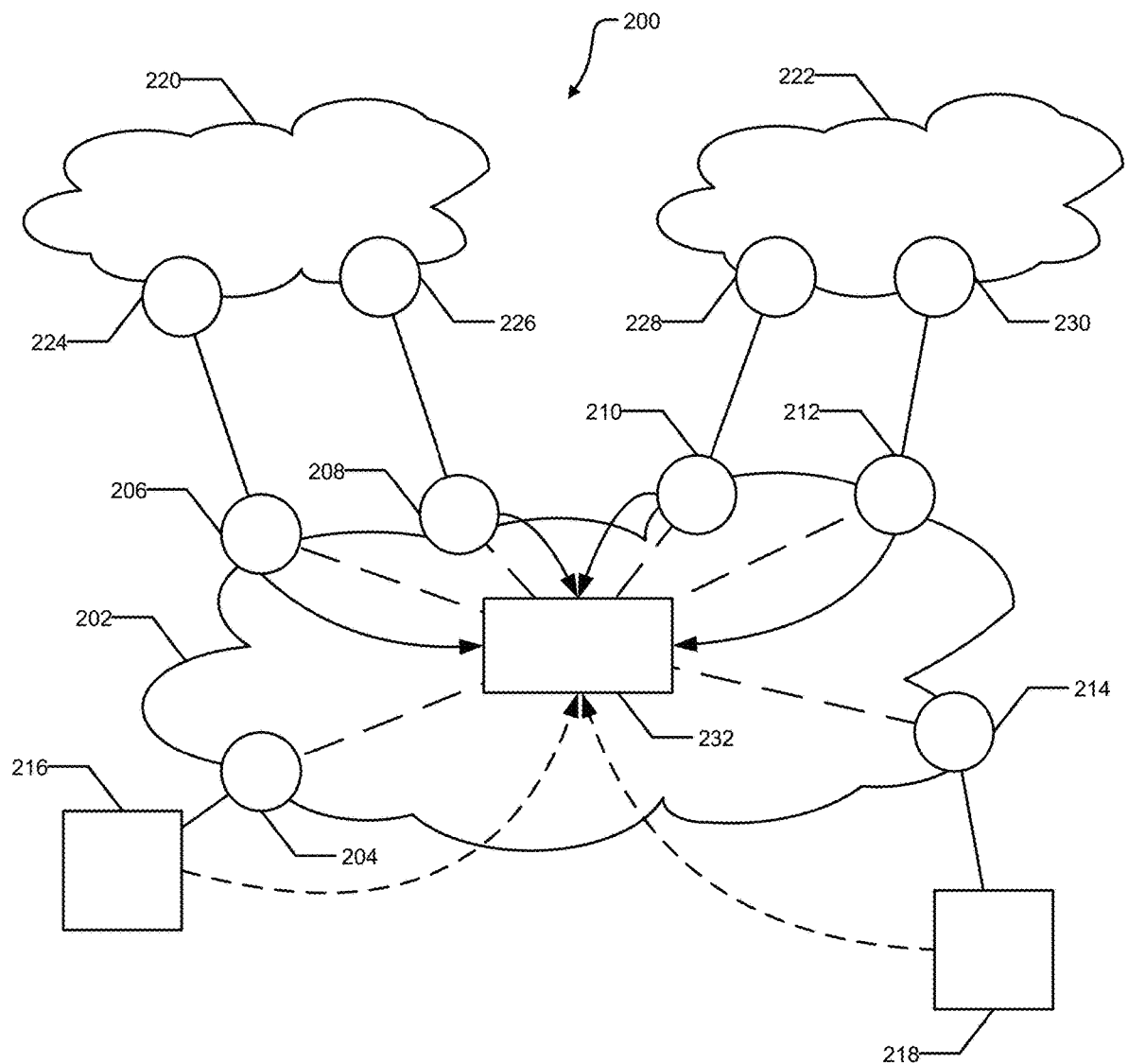
FIG. 2 is block diagram illustrating an anycast CDN system in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204 through 214. The provider edge routers 204 through 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Anycast CDN system 200 can also include a route controller 232. The route controller 232 can exchange routes with provider edge routers 206 through 212 within the CDN provider network 202. As such, the route controller 232 can influence the routes selected by the provider edge routers 206 through 212. Additionally, the route controller 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206 though 212. Provider edge routers 206 through 212 can direct traffic addressed to the anycast address to either of the cache servers 216 and 218 based on the routes provided by the route controller 232. Additionally, the provider edge routers 206 through 212 can advertise the anycast address to AS 220 and AS 222. The route controller 232 can manipulate the route provided to provider edge routers 206 through 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. When anycast traffic from the same client system enters the CDN provider network 202 at both provider edge routers 206 and 208, portions of the traffic may be directed to different cache servers 216 and 218. Persistent and/or secure connections may be disrupted when portions of the traffic are sent to different cache servers 216 and 218. As such, it is undesirable to provide an anycast addresses to client systems within an unstable network.

Figure 3:
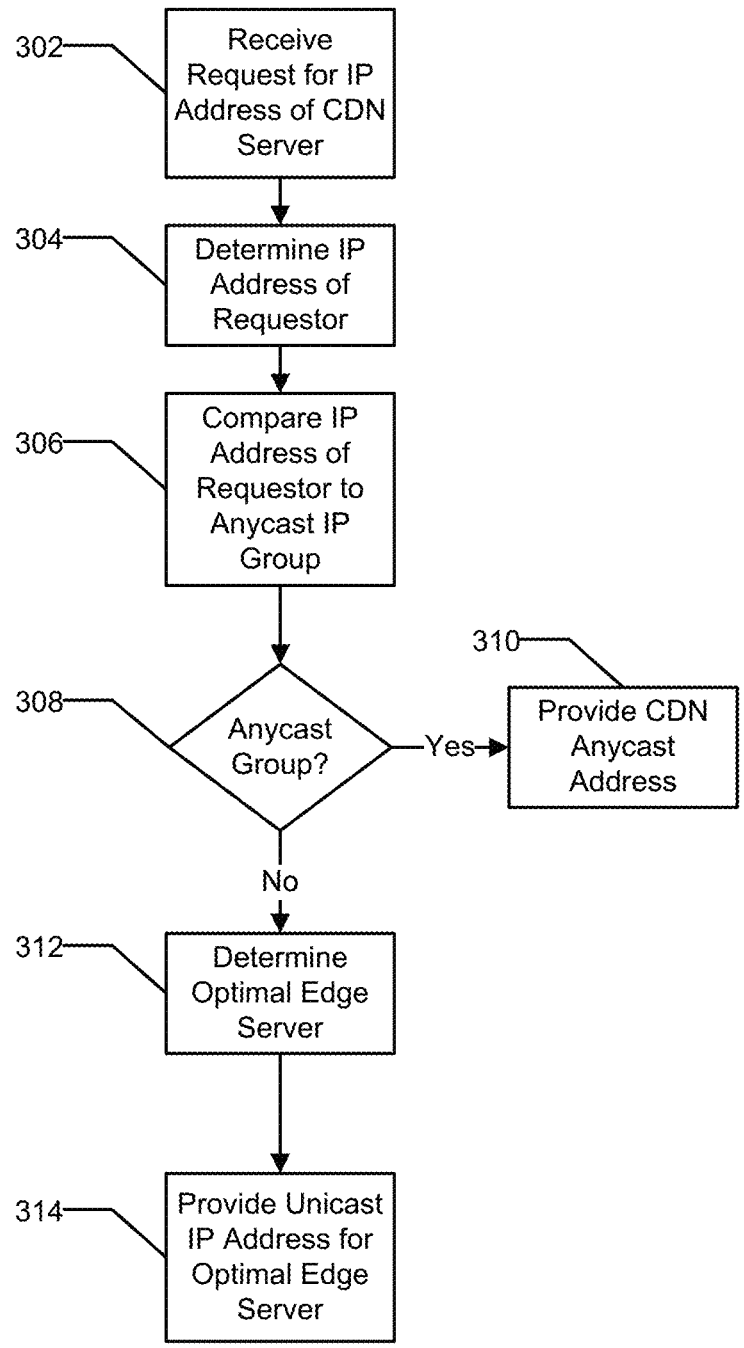
FIG. 3 is a flow diagram illustrating a method of providing an Internet Protocol (IP) address in accordance with one embodiment of the present disclosure.

FIG. 3 illustrates an exemplary method of providing an IP address in response to a DNS hostname resolution request. At 302, a system can receive a request, such as at DNS server 118, for an IP address from a requestor, such as client system 114. At 304, the system can determine the IP address of the requestor, such as the source IP of the request. At 306, the system can compare the IP address of the requestor to an anycast IP address group. The anycast IP address group can include IP addresses belonging to a network controlled by the CDN provider. Additionally, the anycast IP address group can include IP addresses belonging to a stable network. Substantially all traffic from an IP address within a stable network can enter the CDN provider network at the same provider edge router over an extended period of time. Additionally, a stable network may be a network with which the CDN provider has an existing peering relationship regulating how traffic enters the CDN provider network. In contrast, traffic from an IP address within an unstable network can enter the CDN provider network at multiple provider edge routers.

At 308, the system can determine if the requestor is a member of the anycast group. When the requestor is in the anycast group, the system can provide an anycast address associated with the cache servers to the requestor, as illustrated at 310. Requests sent to the anycast address can be directed to one of the cache servers based on the routing rules within the CDN provider network.

Alternatively, when the requestor is not a member of the anycast group, the system can determine an optimal cache server for the requestor, as illustrated at 312. The system may utilize the IP address of the requestor, as well as network topology information to determine the optimal edge cache router. Factors used for the selection of the optimal cache server can include network distance, network cost, available bandwidth, available server capacity, or any combination thereof. At 314, the system can provide the client system with a unicast address for the optimal cache server. Requests sent to the unicast address can be directed to the optimal cache server.

Figure 4:
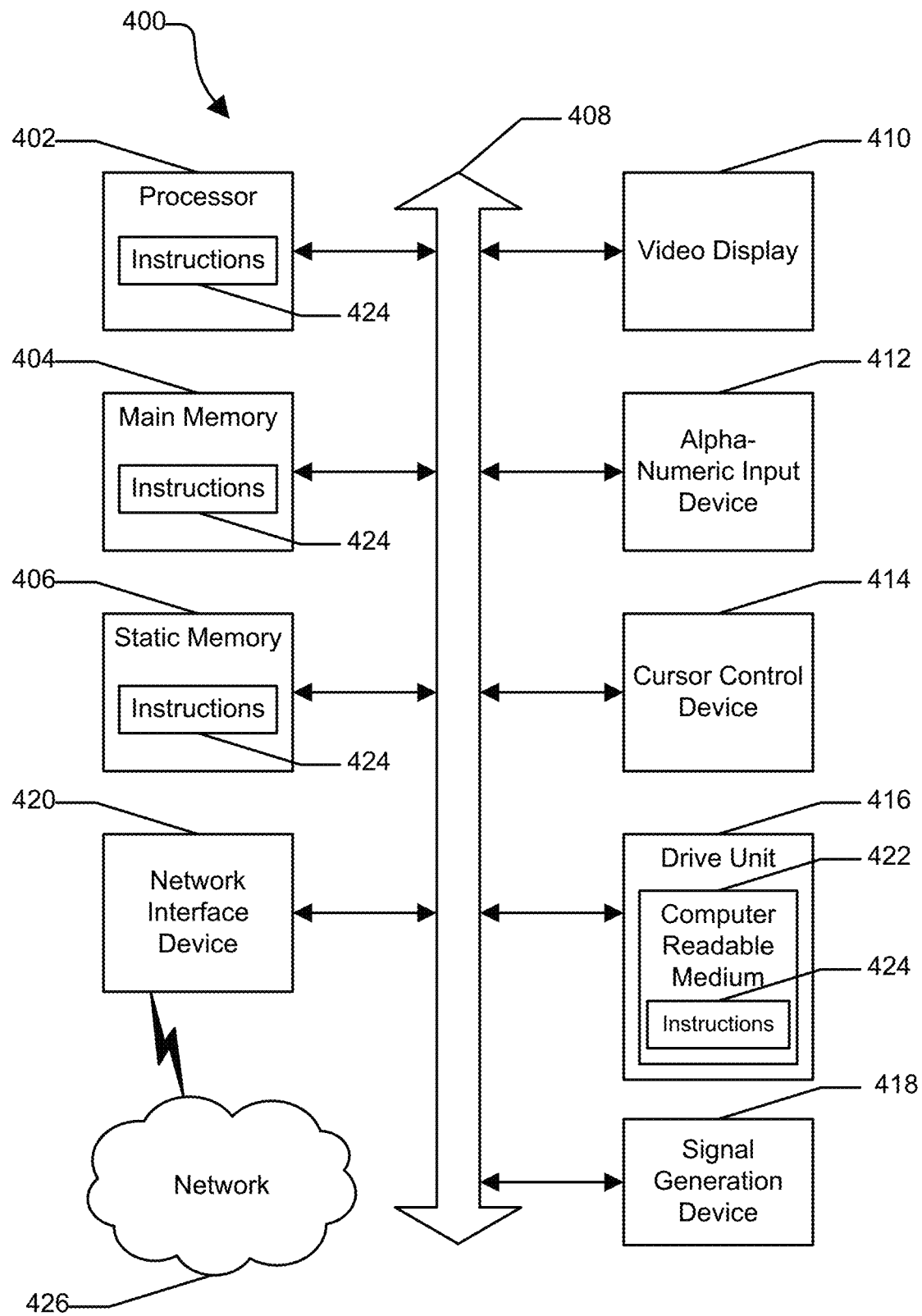
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid-state display, or a cathode ray tube (CRT). Additionally, the computer system 400 may include an input device 412 such as a keyboard, and a cursor control device 414 such as a mouse. Alternatively, input device 412 and cursor control device 414 can be combined in a touchpad or touch sensitive screen. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system comprising:
   a memory that stores instructions; and
   a processor that executes the instructions to perform operations, the operations comprising:
   comparing an address of a requestor to an anycast group,
   wherein when the anycast group is in a stable network, an existing relationship causes requests from the anycast group to enter the network at a same router, and
   wherein when the anycast group is in an unstable network, the traffic enters the network at multiple provider edge routers.

2. The system of claim 1, wherein the operations further comprise receiving, from the requestor, a request for an edge cache address of a cache server.

3. The system of claim 2, wherein the operations further comprise providing, to the requestor, the edge cache address as an anycast address when the address of the requestor is in the anycast group.

4. The system of claim 1, wherein the operations further comprise determining an optimal cache server for the requestor.

5. The system of claim 1, wherein the operations further comprise utilizing the address of the requestor to determine an optimal edge cache router for the requestor.

6. The system of claim 1, wherein the existing relationship relates to regulating how traffic enters a network that includes a cache server.

7. The system of claim 1, wherein the operations further comprise selecting an optimal cache server for the requestor based on a network distance, a network cost, an available bandwidth, an available server capacity, or a combination thereof.

8. The system of claim 7, wherein the operations further comprise providing, to the requestor, a unicast address for the optimal cache server selected.

9. The system of claim 1, wherein the operations further comprise determining an optimal cache server for the requestor when the requestor is not a member of the anycast group.

10. The system of claim 1, wherein the operations further comprise altering a route in a network to a cache server having an anycast address for requests coming from the anycast group.

11. A method, comprising:
comparing, by utilizing instructions from a memory that are executed by a processor, an address of a requestor to an anycast group,
wherein when the anycast group is in a stable network, an existing relationship causes requests from the anycast group to enter the network at a same router, and
wherein when the anycast group is in an unstable network, the traffic enters the network at multiple provider edge routers.

12. The method of claim 11, further comprising receiving, from the requestor, a request for an edge cache address of a cache server.

13. The method of claim 12, further comprising providing, to the requestor, the edge cache address as an anycast address when the address of the requestor is in the anycast group.

14. The method of claim 11, further comprising determining that the requestor is a member of the anycast group if the address of the requestor is in the anycast group.

15. The method of claim 11, further comprising determining an optimal cache server based on the address of the requestor.

16. The method of claim 11, further comprising selecting an optimal cache server for the requestor based on a network distance, a network cost, an available bandwidth, an available server capacity, or a combination thereof.

17. The method of claim 11, further comprising altering a route in a network to a cache server having an anycast address for requests coming from the anycast group.

18. The method of claim 11, further comprising determining an optimal cache server for the requestor when the requestor is not a member of the anycast group.

19. A non-transitory computer-readable device comprising instructions, which, when loaded and executed by a processor, cause the processor to perform operations, the operations comprising:
comparing an address of a requestor to an anycast group,
wherein when the anycast group is in a stable network, an existing relationship causes requests from the anycast group to enter the network at a same router, and
wherein when the anycast group is in an unstable network, the traffic enters the network at multiple provider edge routers.

20. The non-transitory computer-readable device of claim 19, wherein the operations further comprise selecting an optimal cache server for the requestor based on a network distance, a network cost, an available bandwidth, an available server capacity, or a combination thereof.

* * * * *